United States Patent [19]
Basehore et al.

[11] Patent Number: 5,218,562
[45] Date of Patent: Jun. 8, 1993

[54] HAMMING DATA CORRELATOR HAVING SELECTABLE WORD-LENGTH

[75] Inventors: Paul M. Basehore; Charles D. Watson, both of Sanford, Fla.

[73] Assignee: American NeuraLogix, Inc., Sanford, Fla.

[21] Appl. No.: 767,330

[22] Filed: Sep. 30, 1991

[51] Int. Cl.[5] .......................................... G06F 15/336
[52] U.S. Cl. ............................................... 364/728.03
[58] Field of Search ............... 364/728.03, 746.2, 749, 364/757, 760, 786, 724.11, 724.12; 375/1

[56] References Cited

U.S. PATENT DOCUMENTS 4,559,607 12/1985 Lu ................................... 364/728.03
4,825,401 4/1989 Ikumi ................................. 364/757
4,933,952 7/1990 Albrieux et al. .......................... 395/1

Primary Examiner—Jerry Smith
Assistant Examiner—Chuong D. Ngo
Attorney, Agent, or Firm—Cushman, Darby & Cushman

[57] ABSTRACT

A data correlator has a selectable word length for hamming distance measurement. The correlator includes four 32-bit correlators which output a correlation result and a carry signal. The input of the four 32-bit correlators is controlled by a data select circuit, which inputs serial data to each of the four 32-bit correlators in accordance with the selected word length. When the 32-bit length is selected, the data select circuit simultaneously supplies serial data to each of the 32-bit correlators; when the 64-bit length is selected, the data select circuit effectively provides two simultaneously-performing 64-bit correlators; when the 128-bit length is selected, data select circuit streams the serial data through the four 32-bit correlators. A summation circuit preserves the carry-in signal of each 32-bit correlation in order to generate two 64-bit correlation values and one 128-bit correlation value. The data comparator also includes a CPU bus interface for sharing data on a CPU bus and a control register for automatic addressing of internal registers of the data comparator.

10 Claims, 12 Drawing Sheets

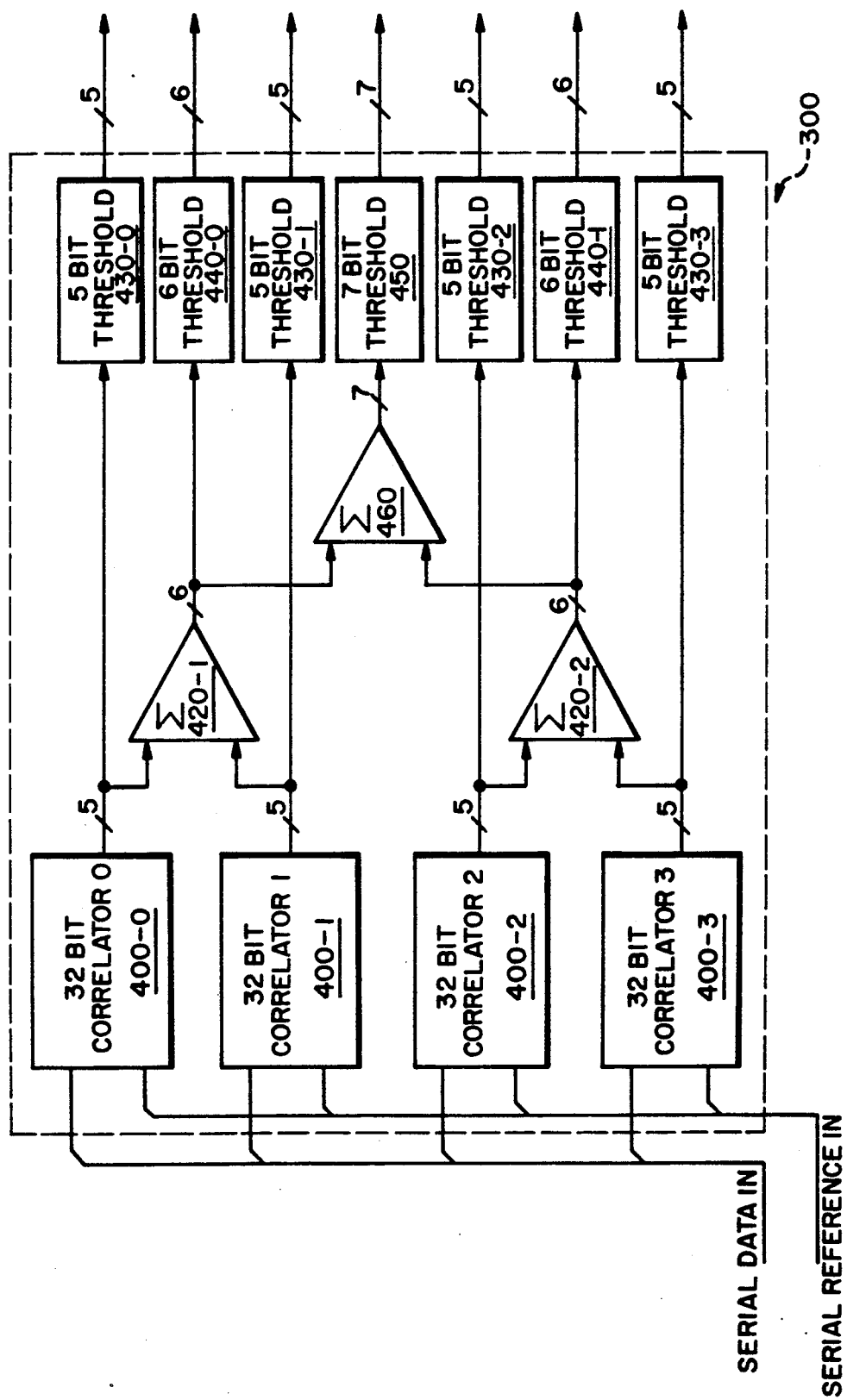

HAMMING DATA CORRELATOR HAVING SELECTABLE WORD-LENGTH

BACKGROUND OF THE INVENTION

1. Field of the Invention

The present invention relates to data correlators designed to perform hamming distance correlations on real-time data.

2. Description of the Related Art

Data correlators have been developed which use hamming distance as a measure of correlation between real-time data and a predetermined reference pattern. Data correlators count the number of occurrences of bit matches between a serial input data and a reference data pattern producing a hamming distance correlation value. Such data correlators are effective in applications which require fast correlations between real-time input bit streams and a reference pattern. Such applications include image comparison and recognition, radar/sonar pattern matching, data synchronization, flag word detection, check sorting equipment, bar code identification, video frame synchronization, and time delay measurement systems.

A 64-bit data correlator implementing hamming distance correlation was developed by TRW LSI Products, Inc., La Jolla, Calif., known as the TDC 1023 Digital Output Correlator. The TDC 1023 has an implementation resembling the exemplary circuit diagram shown in FIG. 1. FIG. 1 shows a data correlator 100 which correlates serial input data to stored reference pattern data in real-time. The data correlator 100 receives SERIAL INPUT DATA one bit at a time by serially shifting and latching the SERIAL INPUT DATA into data register 10. The serial shifting and latching are enabled on the transition of a clock-1 signal (not shown). The SERIAL REFERENCE PATTERN DATA is clocked into a temporary reference data register (not shown) one bit at a time by serially shifting and latching on the transition of a clock-2 signal (not shown). The data in the temporary reference data register is latched into reference data register 15 by a LATCH ENABLE signal (not shown). The data correlator 100 receives serial mask data one bit at a time by serially shifting and latching the serial mask data into mask register 20. A threshold register 25 is loaded 7 bits in parallel by an IO bus and latched by a CLOCK-3 (not shown). The hamming distance correlation is performed by the XOR-AND circuit 30. Logic level zero bits in the mask register 20 effectively mask out the results of the hamming distance correlation for those bit positions. The XOR-AND circuit 30 outputs a logic level 1 when a bit of data in the data register 10 is not the same logic value as the corresponding bit of data in the reference data register 15, excluding masked bit positions. A summation circuit 35 sums all of the bits in agreement (e.g., when the hamming distance equal zero) received from the XOR-AND circuit 30, i.e all of the ones from the XOR-AND circuit 30 are added. The summation circuit 35 either can output the sum directly to the 7 bit parallel bus IO or to a comparator 40. The comparator 40 compares the summed value from the summation circuit 35 to a threshold value stored in threshold register 25. The comparator 40 outputs a logic value 1 when the summed value is greater than or equal to the threshold value.

A major limitation of the device of FIG. 1 is that the word size is fixed at 64 bits. To overcome this problem, a 128-bit data correlator implementing hamming distance correlation has been developed by TRW LSI products, known as the TMC 2221 CMOS Programmable Digital Output Correlator. The TMC 2221 has an implementation resembling the exemplary circuit diagram shown in FIG. 2. FIG. 2 shows a 128-bit data correlator 200 with four 32-bit data correlators 100 similar to the 64-bit data correlator shown in FIG. 1. The 32-bit data correlator 100 is the same as 64-bit data correlator 100 except that the 32-bit data correlator 100 has 32 bit registers instead of 64-bit registers. The serial input signals SERIAL DATA IN and SERIAL REFERENCE IN are serially loaded as described for the 64-bit data correlator except the serial data flows from one 32-bit data correlator to the next adjacent correlator 100 until the correlator 100-3 stores the first thirty-two bits of the serial data. Each 32-bit data correlator 100 outputs a correlation value as described for the 64-bit data correlator. The correlation values are summed two at a time by adders 210-0 and 201-1 and then combined in combining matrix 220. The combining matrix 220 outputs the sum of the correlation values on a 8 bit parallel bus RESULTS.

As shown above, the data correlators have a predetermined word size, so a different chip is required when an application requires a different size word to be correlated. This limitation becomes apparent when flexibility in word-length is needed: not only does it become costly to maintain a stock of several different word size chips but also the space required for the additional chips increases the size of the PC board to which the chips are mounted. Further, if the apparatus of FIG. 2 was to be used in a 32-bit configuration mode, correlators 100-1, 100-2 and 100-3 would be disabled, resulting in inefficient use of circuitry.

Finally, the necessity of a different chip to obtain a different size word to be correlated requires the user to make design and programming changes based upon the different protocols for each chip.

It would be desirable to provide a data correlator arrangement which was specifically implemented for high speed real-time data correlation which was user configurable. Specifically, it would be advantageous to allow the user to select a 32-bit, 64-bit or a 128-bit word size data correlator. In addition, if the data correlator is interfaced with a microprocessor, it would be desireable to be able to load all correlation parameter data through the microprocessor bus, except for the serial input data which undergoes bitwise hamming distance data correlation. Finally, it would be desirable if the data correlator arrangement was implemented to allow real-time data correlation at speeds up to 50 MHz, thereby increasing the number of different applications.

SUMMARY OF THE INVENTION

It is an object of the present invention to provide a low cost, high speed (up to 50 MHz), and user configurable data correlator using a hamming distance measure of difference between reference data and serial input data capable of receiving and sending data to and from a standard 8-bit microprocessor bus.

It is a further object of the present invention to provide a user configurable data correlator which automatically provides the appropriate addressing sequence in accordance with the configuration of the data correlator.

It is another object of the present invention to maximizing efficiency of transferring data on a microprocessor bus between a microprocessor and the data correlator.

It is still another object of the present invention to provide a selectable word-length data correlator which makes efficient use of internal data comparators.

It is a further object of the present invention to provide a parallel structured adder which is optimized for speed and low-cost implementation to determine the amount of correlation between serial input data and stored reference data.

In order to achieve these and other objects, a low-cost and efficient data correlator is disclosed which performs either auto-correlation or cross-correlation bit pattern comparisons between stored reference data and serial input data.

The data correlator according to the present invention has selectable configurations responsive to external configuration signals. When the data correlator has a 32-bit or 64-bit configuration, the data correlator performs simultaneous correlations of a plurality of serial input data. Specifically, the data correlator may be configured internally as four 32-bit, two 64-bit or one 128-bit data correlator, whereby the four 32-bit or two 64-bit correlators operate in parallel. The internal configuration is transparent to the user once the internal configuration is chosen.

In the four 32-bit data correlation mode, each of the four 32 bit data correlators receives 32 bits of serial input data from a corresponding serial input data line. Specifically, the leading bit of the input data is latched and the previously latched data is shifted. Thereafter, each 32 bit data correlator performs a 32-bit hamming distance correlation producing a correlation value. The correlators operate in a pipelined mode, so that the latching shifting and correlating are performed within one clock cycle. The correlation value is either passed to a threshold compare circuit to compare the correlation values to a predetermined threshold value or output directly to a microprocessor bus. If the correlation value is greater than the threshold value a low match flag is output. The match flags for each correlation value simultaneously appear on the microprocessor bus when a threshold compare operation is enabled. Bit positions which are not important to determine the correlation between data and reference data patterns can be masked out of the correlation when so designated by mask bits. The mask information is loaded in 8-bit blocks through a 8-bit microprocessor bus. The serial input data is loaded serially, and the reference data may be loaded either serially or parallely. Match flags and raw correlation results may be obtained for each correlation performed.

In the two 64-bit data correlator mode, two 32 bit correlators work in series, two sets of two 32 bit correlators each forming a 64-bit correlator. A data select circuit controls the pipeline-mode propagation of serial data throughout the 32-bit correlators. Specifically, two of the four 32 bit data correlators receive 64 bits of serial input data and the other two of the four 32-bit data correlators each receive the first 32 bits of serial input data after the data has passed through the first two 32-bit correlators and the data select circuit.

Each 32 bit correlator performs a 32-bit hamming distance correlation at every clock cycle, producing a correlation value and carry-in bit. The correlation values of each set of two 32 bit correlator are added together by a summation circuit to produce a 64-bit correlation value while preserving the carry-in bit. The correlation value is either passed to a threshold compare circuit for comparison between the correlation values and the predetermined threshold value or output to a microprocessor bus. If the correlation value is greater than the threshold value a low match flag is output. The match flags for each correlation value appears simultaneously on the microprocessor bus when a threshold compare operation is enabled.

Since each of the carry-in bits of the 64-bit correlation values are preserved, the values can be combined to form a 128-bit correlation value. In the one 128-bit data correlator mode, four 32 bit correlators work in series under the control of the data select circuit, resulting in one set of four 32 bit correlators working in conjunction. As a result, the first of the series of four 32 bit data correlators latches and shifts 128 serial bits, the next one latches and shifts 96 bits, the following one latches and shifts 64 bits, and the final one latches and shifts 32 bits of serial input data. Each 32 bit correlator performs a 32-bit hamming distance correlation after each latching and shifting of a bit, producing a correlation value during each clock cycle. The correlation values of each 32 bit correlator are added together by the summation circuit to produce a 128-bit correlation value. The correlation value is either passed to a threshold compare circuit for comparison between the correlation values and the predetermined threshold value or output to a microprocessor bus. If the correlation value is greater than the threshold value a low match flag is output. The match flag for the correlation value appears on the microprocessor bus when a threshold compare operation is enabled.

The data correlator according to the present invention includes a CPU bus interface which enables the multiplexing of correlation scores and control instructions on the CPU microprocessor bus. The CPU bus interface multiplexes the appropriate data in response to a CPU address bus and a read/write signal from the microprocessor. Thus, the efficiency of the CPU bus is enhanced by sharing data on the CPU bus, minimizing the number of data lines. In addition, the CPU bus interface multiplexes internal data on a single internal data bus to minimize data lines and maximize efficiency of the internal data bus.

The data correlator also includes a control register which enables automatic addressing of the 32-bit correlators and the threshold registers. Thus, a user is no longer burdened by reprogramming his application whenever a correlation is switched from a 32-bit mode to a 64-bit or 128-bit mode. The user merely inputs the same addresses and changes the configuration signals which control the configuration mode of the data correlator.

The data correlator also includes a data select circuit which controls the propagation of serial data through the 32-bit comparators in accordance with the configuration mode of the data correlator. Thus, the data correlator according to the present invention can efficiently perform either as four 32-bit correlators operating simultaneously and in parallel, or two 64-bit correlators operating simultaneously and in parallel, or a single 128-bit correlator.

Finally, the data correlator includes a summation circuit which effectively multiplexes the outputs of the 32-bit comparators in accordance with the configuration mode. Specifically, the summation circuit outputs either four 32-bit correlation results as 5-bit values, two 64-bit correlation results as 6-bit values, or a 128-bit correlation value as a 7-bit value. The summation circuit preserves the carry bit of the 32-bit correlation values to efficiently determine the 64-bit and 128-bit correlation values.

Thus, the data correlator of the present invention provides a variable word-length correlator providing efficient and flexible correlation results. Other advantages and features will become apparent from the description below.

BRIEF DESCRIPTION OF THE DRAWINGS

Reference is made to the attached drawings, wherein elements having the same reference numeral designations represent like elements throughout, and wherein:

FIG. 6 shows a block diagram of the data comparator of FIG. 3.

DETAILED DESCRIPTION OF THE PREFERRED EMBODIMENT

The preferred embodiment of the present invention will now be described with reference to the accompanying drawings.

Figure 1:
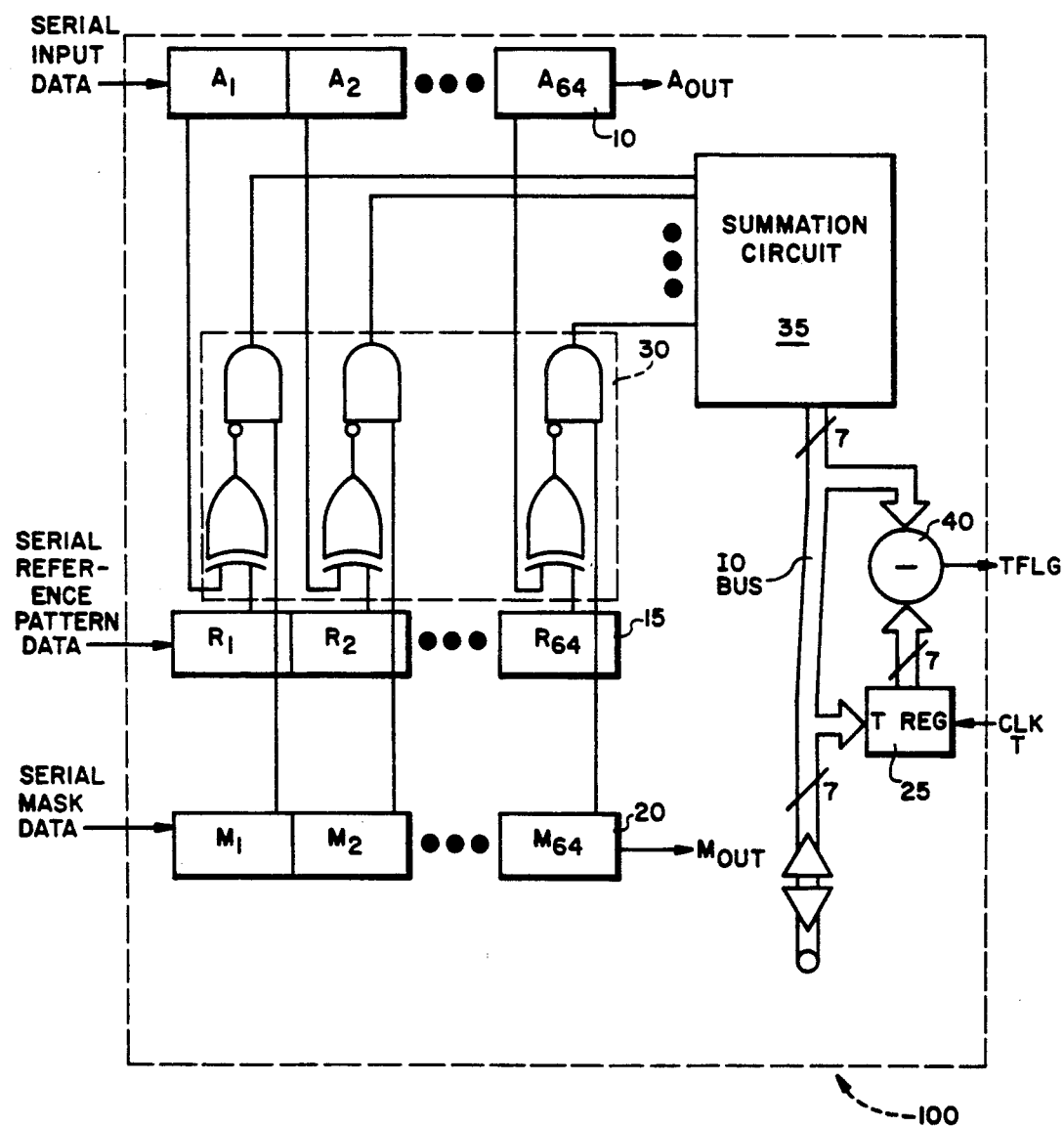
FIG. 1 illustrates a block diagram of a conventional 64-bit digital data correlator.
Figure 2:
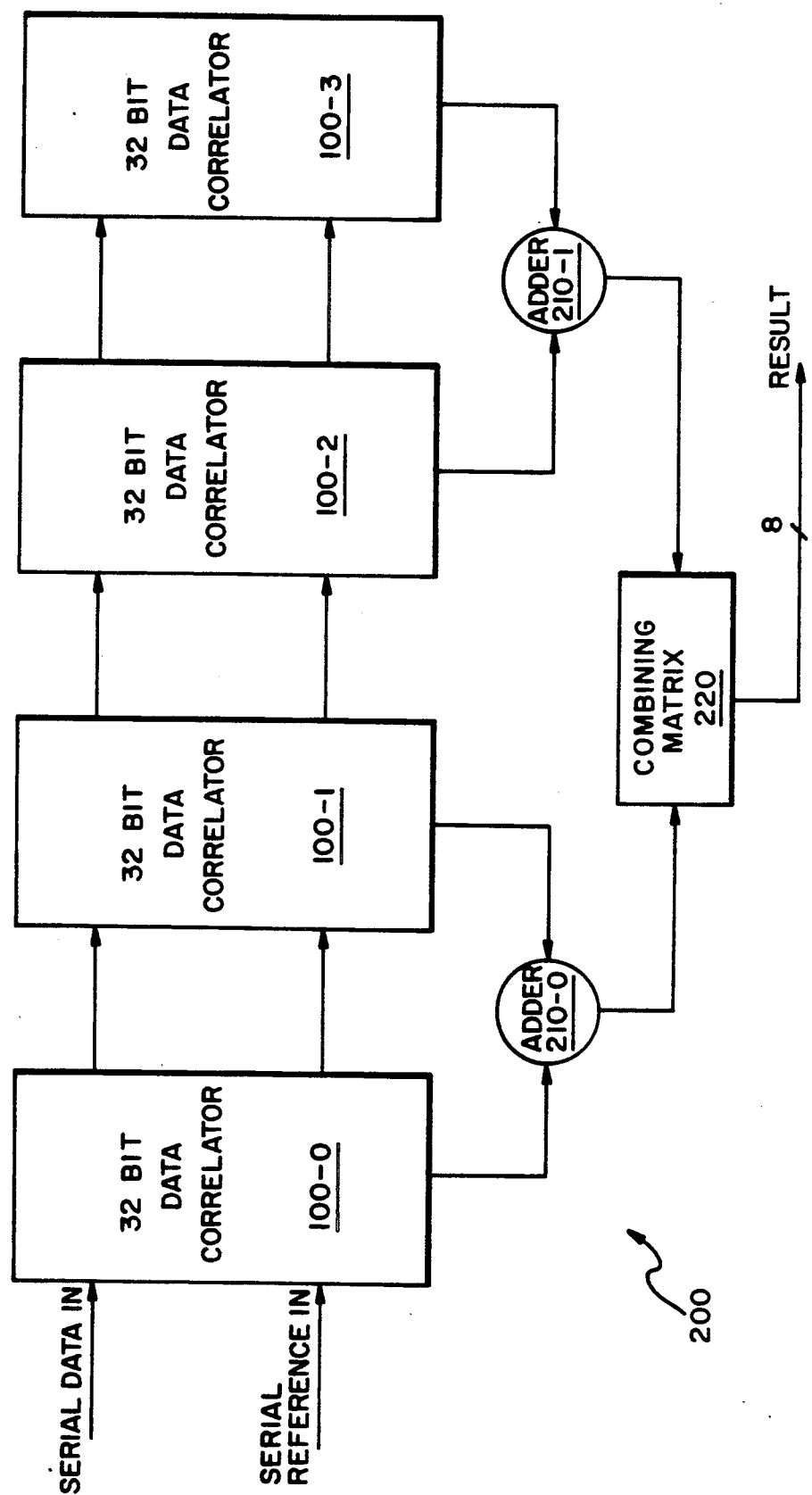
FIG. 2 illustrates a block diagram of another conventional 128-bit digital data correlator.
Figure 3:
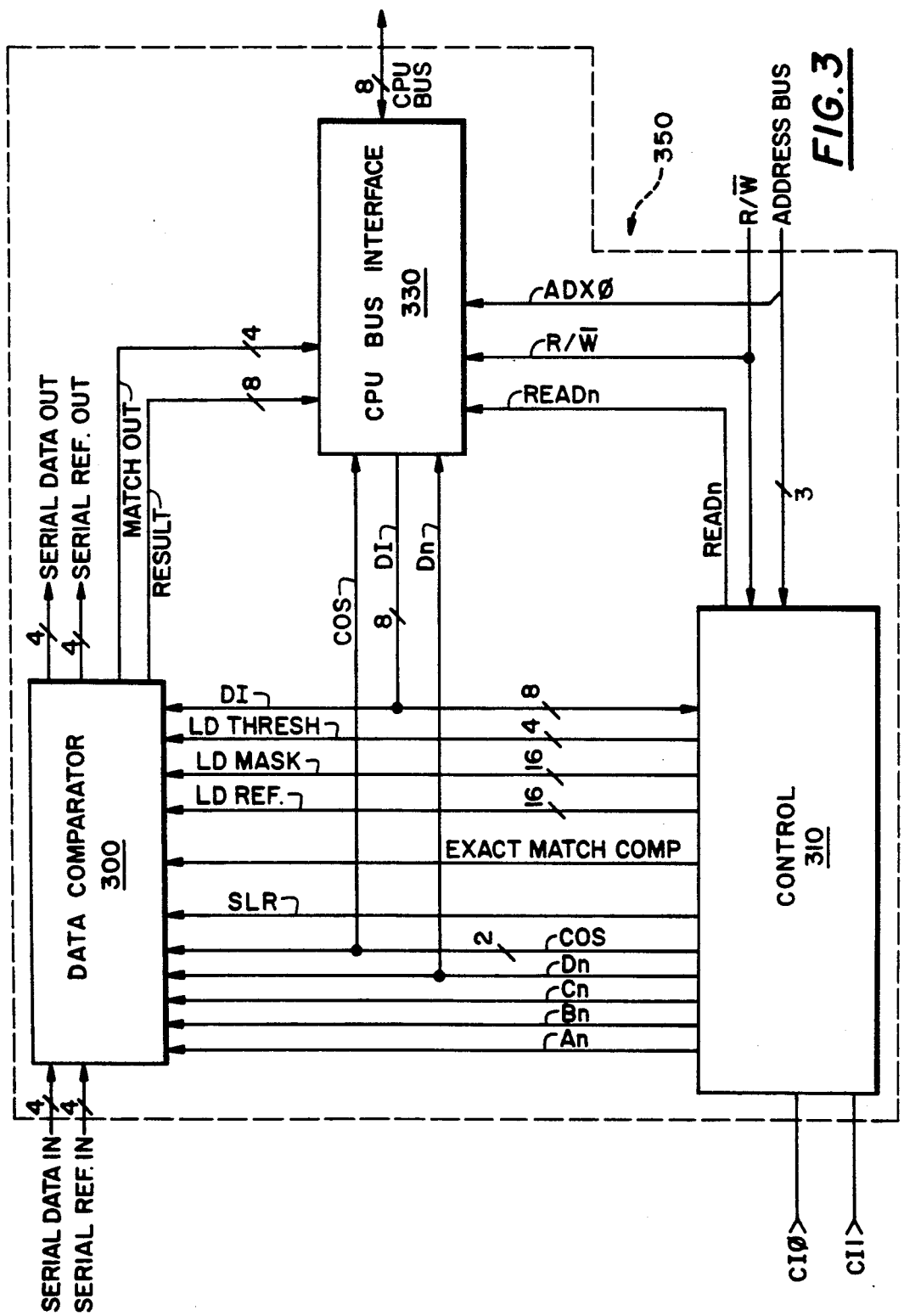
FIG. 3 shows a block diagram of a data correlator according to a preferred embodiment of the present invention.

FIG. 3 shows a block diagram of a data correlator 350 according to a preferred embodiment of the present invention. The data correlator 350 includes a CPU bus interface 330 for inputting and outputting data between the data correlator 350 and a conventional 8-bit microprocessor (CPU) bus. The CPU bus has an 8-bit parallel configuration, so that the CPU bus interface 330 outputs or receives the 8-bit data in parallel. The CPU bus interface 330 can receive data such as control, reference, and mask data from the CPU bus. Also, the CPU bus interface 330 outputs correlation data such as correlation scores and match flags to the CPU bus.

The CPU bus interface 330 reads data off of the CPU bus when an externally-supplied read/write (R/W) control line is enabled. In the preferred embodiment of the present invention, a high signal on the R/W control line enables the CPU bus interface 330 to read the data on the CPU bus. The CPU bus interface 330 also receives a least significant address bit ADX0 from an address bus to be used in conjunction with other control signals (described below) to control the output of the CPU bus interface 330 onto the CPU bus.

The CPU bus interface 330 is coupled to a data comparator 300 which outputs 8-bit correlation scores on a RESULT signal path and 4-bit match results (or match flags) on a MATCH OUT signal path indicating whether the correlation scores are within a corresponding threshold (described in detail below). The CPU bus interface 330 outputs to the data comparator 300 correlation parameter data such as reference or mask data via an 8-bit signal path DI. The CPU bus interface 330 also outputs control data to a control unit 310 via the 8-bit signal path DI. Thus, the CPU bus interface 330 can transmit various control data and correlation parameter data on the single 8-bit DI signal path, thereby facilitating data transmission.

The control unit 310 receives read/write information from external circuitry through the read/write line (R/W) a described previously in reference to the CPU bus interface 300. Also, the control unit 310 receives address information from external circuitry via a 3-bit address but having address lines ADX0, ADX1, and ADX2.

The control unit 310 is coupled to the data comparator 300 and provides control data for loading and outputting data and configuration control data to determine the mode of operation by the data comparator 300. A 2-bit comparison out select signal COS output from control 310 determines which match results are to be output by the data comparator 300 on the MATCH OUT signal path and output by the CPU bus interface 330. The control unit 310 also outputs a write control line (READn) to enable the CPU gus interface 330 to output data so that external circuitry can read the data on the CPU bus.

The control unit 310 receives internal configuration signals CI0 and CI1, which are externally-supplied and define the internal configuration of the data correlator 350, for example whether the data correlator 350 is to operate in a 32-bit, a 64-bit or a 128-bit mode. The configuration signals CI0 and CI1 are decoded by the control unit 310 into four configurations of operation which are transmitted to the data comparator 300 and the CPU BUS interface 330 on control lines An, Bn, Cn and Dn.

The control unit 310 controls the correlation functions of the data comparator 300. For example, the data comparator 300 performs an exact match comparison in response to an exact match comparison signal EXACT MATCH COMP. The control unit 310 also enables the proper loading of data on the DI signal path by the data comparator 300. For example, loading of threshold information into data comparator 300 is enabled by the 4-bit threshold load control line LD THRESH. The loading of mask information into data comparator 300 from the signal line DI is enabled by a 16-bit mask load control signal LD MASK from the control unit 310. The loading of correlator reference information into data correlator 300 is enabled by a 16-bit reference load signal LD REF.

The data comparator 300 simultaneously receives via external circuitry four bits of serial input data through the 4-bit serial data stream SERIAL DATA IN and four bits of serial reference data through a 4-bit serial reference stream SERIAL REF IN. Thus, the data correlator 300 can load correlation reference information either serially (via SERIAL REF IN) or in parallel (via DI) in response to the control unit 310. The manner in which the 4-bit serial input data streams SERIAL DATA IN and the 4-bit serial reference data streams SERIAL REF IN are utilized as input lines will be explained in more detail in reference to FIGS. 7A and 7B. The data comparator 300 simultaneously outputs to external circuitry four bits of serial data through 4-bit serial data streams SERIAL DATA OUT and four bits of serial reference data through 4-bit serial reference streams SERIAL REF OUT. The manner in which the 4-bit serial data streams SERIAL DATA OUT and serial reference data streams SERIAL REF OUT are utilized as output lines will be explained in more detail in reference to FIGS. 7A and 7B.

Figure 4:
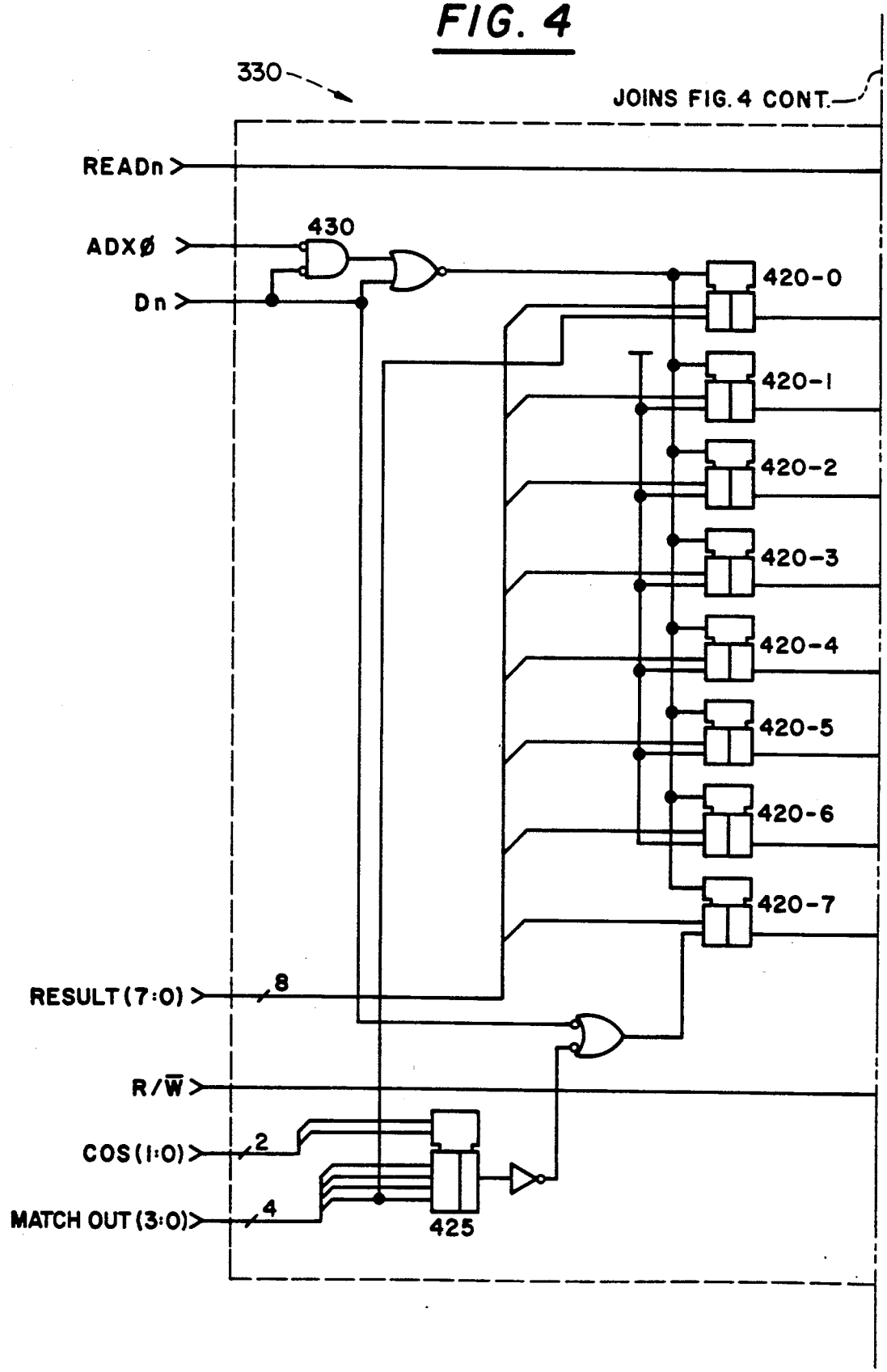
FIG. 4 shows an exemplary circuit diagram of the CPU bus interface of FIG. 3.
Figure 4:
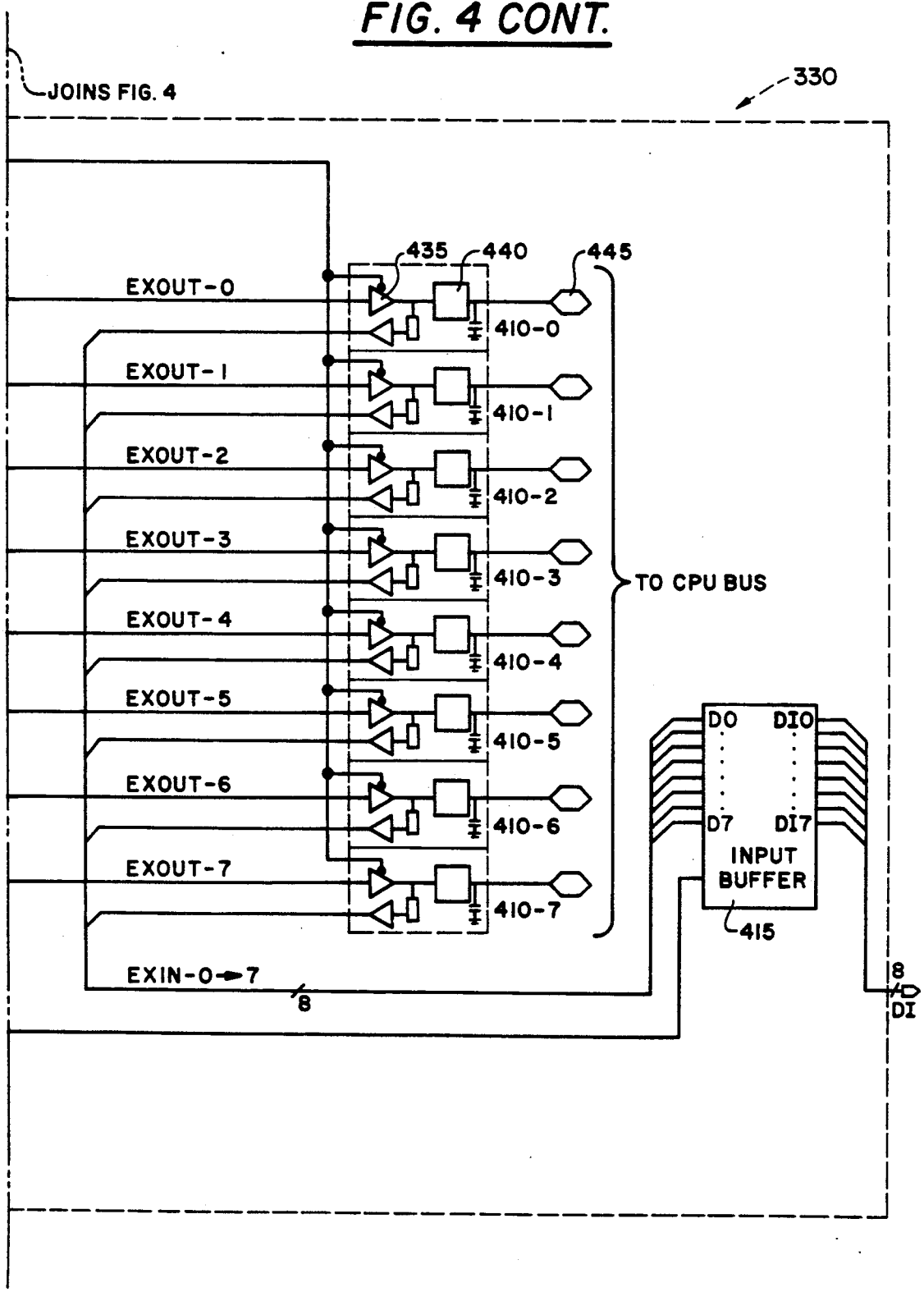

FIG. 4 shows an exemplary circuit diagram of the CPU BUS interface 330 shown in FIG. 3. As shown in FIG. 4, the READn signal controls a tri-state buffer 435 to enable the transmission of signals EXOUT to a pad pin 440 and an electrode 445 to direct the signal EXOUT onto the CPU bus. The signal EXOUT is an inverted output of an array of 2-to-1 multiplexers 420, which output either an 8-bit RESULT signal or a MATCH OUT signal in response to the ADX address signal and the Dn configuration signal. Specifically, multiplexer 420-0 outputs the MATCH OUT(3) signal, multiplexers 420-1 to 420-7 output logic level zeros when address signal ADX0 is logic level 1 and Dn=0. The Dn signal defines a predetermined configuration state, such as a special chip-compatability mode. A comparison out select signal (COS) selects which MATCH OUT signal to output from the multiplexer 425 when the signal Dn=1.

The CPU bus interface 330 inputs data from the CPU bus as shown in FIG. 4. An input signal is transmitted to the electrode 445 and pad pin 440 and then latched by an input buffer 415 in response to a read/write signal R/W.

Figure 5:
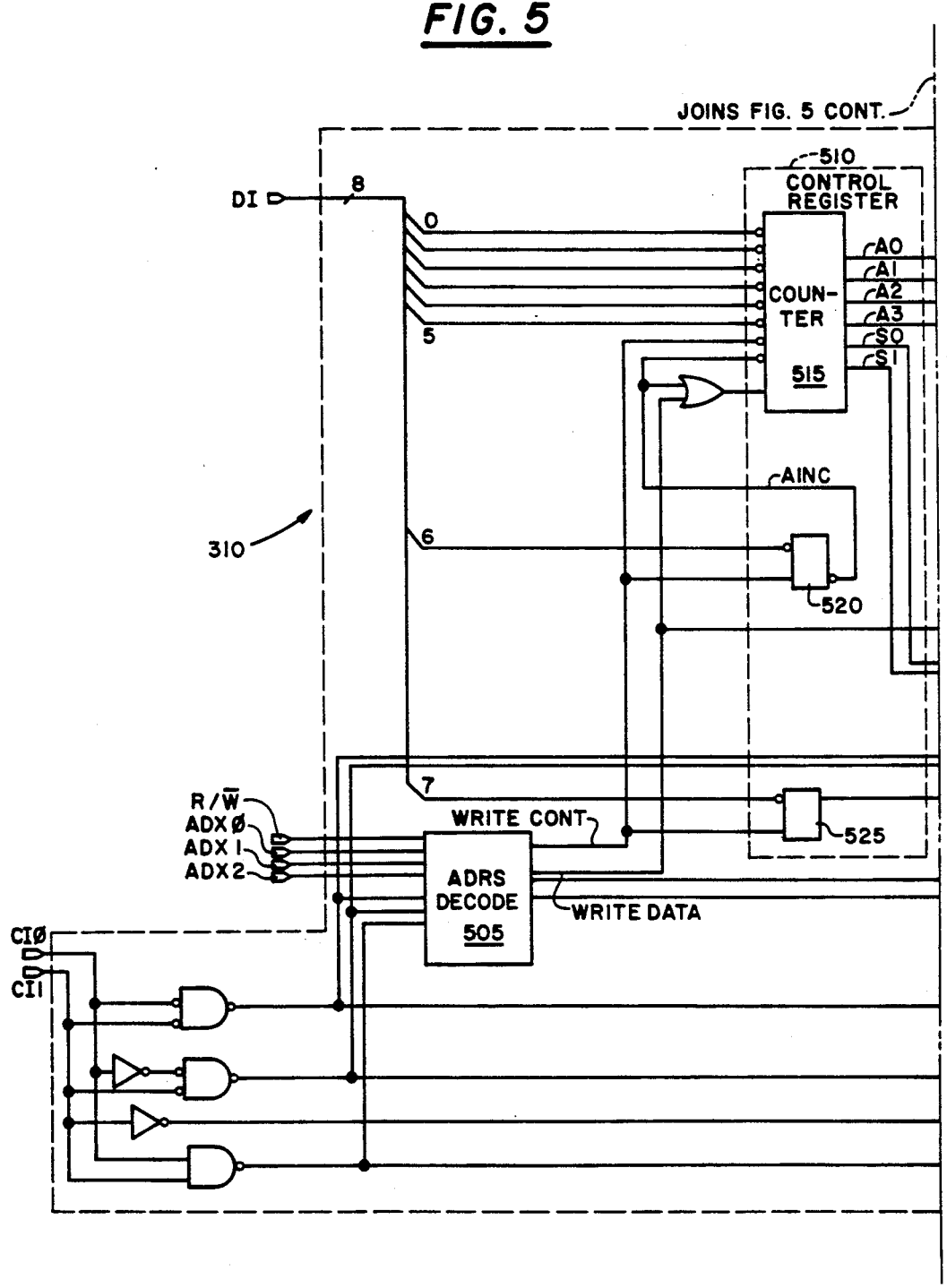
FIG. 5 shows an exemplary circuit diagram of the control unit of FIG. 3.
Figure 5:
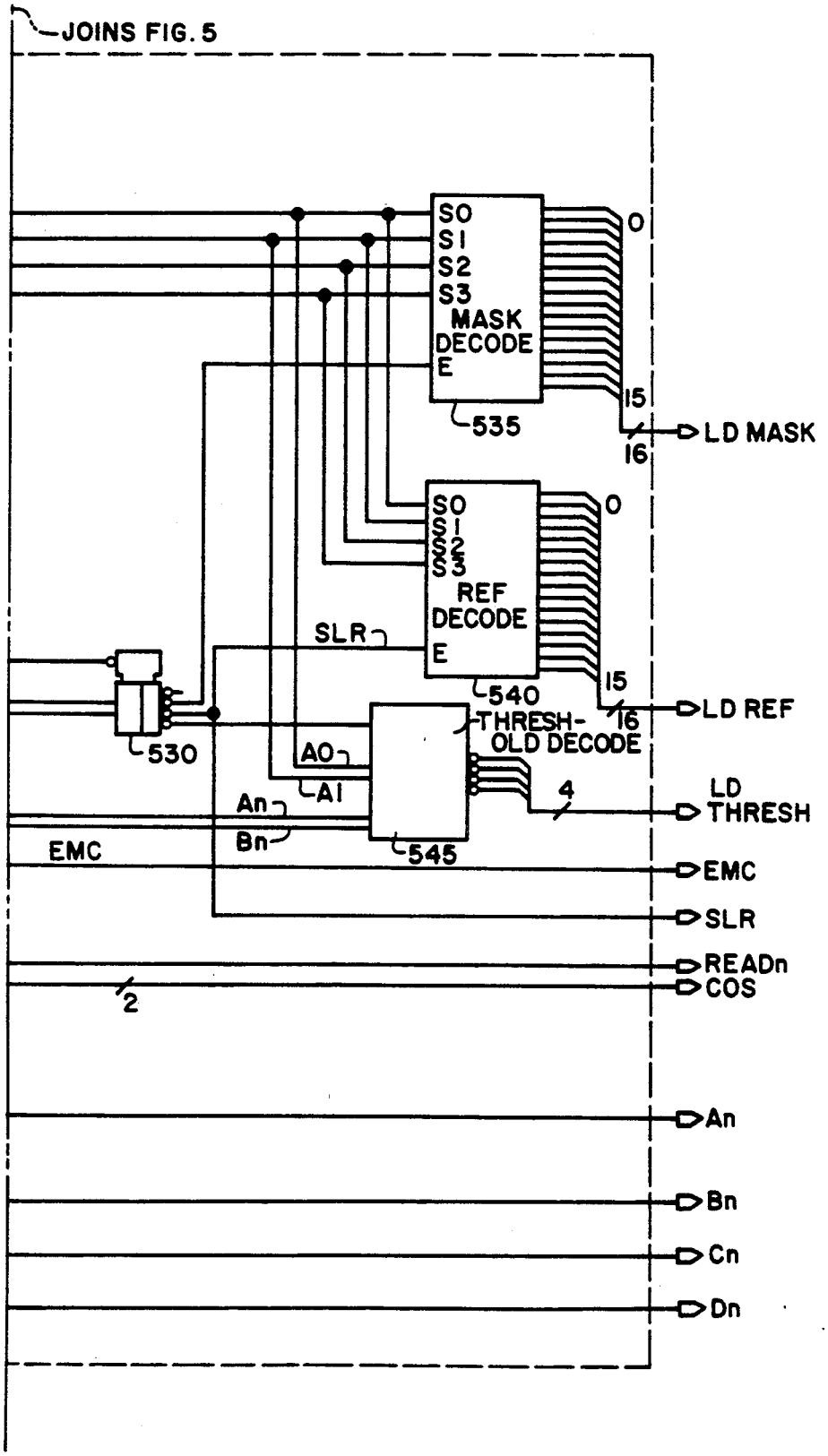

FIG. 5 shows an exemplary circuit diagram of the control unit 310 shown in FIG. 3. As shown in FIG. 5, the internal configuration signals CI0 and CI1 are decoded to provide control signals An, Bn, Cn and Dn. The internal configuration signals CI0 and CI1 are used to select the mode of operation for the data correlator 350. For example, the data correlator 350 operates internally as four 32-bit correlators when CI0 and CI1 are both logic level zero (mode A). When configuration signals CI0 is logic level zero and CI1 is logic level one, the data correlator 350 operates internally as two 64-bit data correlators (mode B). The data correlator 350 operates as one 128-bit data correlator when internal configuration signal CI1 is a logic level 1 (mode C & D). In addition, according to the preferred embodiment, the data correlator 350 operates in a CS1212 chip compatible mode when both internal configuration signals CI0 & CI1 are logic level 1 (mode D). The CS1212 chip compatability is a protocol used with the CS1212 chip disclosed by Chip Supply, Inc., Orlando Fla. The available configuration options are summarized in TABLE 1.

TABLE 1

| | | Configuration Options: |
|---|---|---|
| C0 | C1 | Correlator Configuration |
| 0 | 0 | 4 × 32 bit correlator (Mode A) |
| 1 | 0 | 2 × 64 bit correlator (Mode B) |
| 0 | 1 | 1 × 128 bit correlator (Mode C) |
| 1 | 1 | 1 × 128 bit correlator (Mode D) (CS1212 compatible) |

Reading and writing data in the data correlator 350 is controlled by an address decoder 505. The address decoder 505 decodes address signals ADX0, ADX1, and ADX2, mode signals An, Bn and Dn and the read/write signal R/W to output control signals WRITE CONT, WRITE DATA, READn and the comparison out select signal COS. Table 2 shows the functions performed in response to the inputs to the address decoder 505.

TABLE 2

| FUNCTIONS OF DATA CORRELATOR | | | |
|---|---|---|---|
| ADX2 | ADX1 | ADx0 | Data Correlator Function |
| 0 | 0 | 0 | Output comparator 0 results |
| 0 | 0 | 1 | Output comparator 1 results |
| 0 | 1 | 0 | Output comparator 2 results |
| 0 | 1 | 1 | Output comparator 3 results |
| 1 | 0 | 0 | Read control information into control register (Modes A, B & C) |
| 1 | 0 | 1 | Read data register selected (Modes A,B,C) |
| 1 | 1 | 0 | Read control register selected (Mode D) |
| 1 | 1 | 1 | Access data register selected (Mode D) |

\* = Don't care

The data to be written to the data comparator 350 is addressed by a control register 510. Specifically, the control register 510 performs automatic addressing of the data to be written to the data comparator 300. The automatic addressing is performed by incrementing the address input via the DI signal line to the control register 510. Thus, once the address is input to the control register 510, the control register 510 automatically determines the appropriate address for the subsequent data supplied on the 8-bit data DI bus. TABLE 3 shows the configuration of the control register 510.

TABLE 3

| D7 | D6 | D5 D4 | D3 D2 D1 D0 | bit positions |
|---|---|---|---|---|
| EMC | AINC | S1-S0 | A3-A0 | signal |

The data bits 0-3 on the DI bus correspond to address signals A0-A3 for addressing up to sixteen register locations. The data bits DI(4) and DI(5) correspond to register select signals S0 and S1, respectively. Data bit DI(6) enables the autoincrement signal AINC, and data bit DI(7) enables the exact match comparator EMC signal (described in further detail with reference to FIGS. 7A and 7B).

As shown in FIG. 5, the control register 510 includes a counter 515, and two D flip-flops 520 and 525. The write control signal WRITE CONT from the address decoder 505 enables the control register 510. D flip flop 525 latches control signal EXACT MATCH COMP (EMC) from the data input bus DI(7), which determines if an exact match comparison is to be performed. D flip flop 520 latches an autoincrement signal AINC from data input bus DI(6) in response to the write control register enable signal WRITE CONT from the decoder 505. The counter 515 is a modulo 128 counter which latches the address input by bits 0-5 of the DI signal line. The counter 515 automatically increments to a next sequential address in response to the automatic increment signal AINC output by D flip flop 520, and outputs address lines A0-A3, S0 and S1.

The register select signals S0 and S1 are output from the counter 515 of the control register 510 to a decoder 530, which outputs an enable signal in response to the register select signals. Specifically, a mask decoder 535 is enabled when S1=0 and S0=1; the decoder 530 enables a reference decoder 540 by outputting a serially load register control signal SLR when S1=1 and S0=0; and a threshold decoder 545 is enabled when S1=1 and S0=1.

The threshold decoder 545 outputs the 4-bit threshold register load signals LD THRESH in response to the internal configuration signals An and Bn and address signals A0 and A1. The reference decoder 540 and the mask decoder 535 output a 16-bit reference register load signal LD REF and a 16-bit mask register load control signal LD MASK in response to the address signals A0-A3, respectively.

FIG. 6 shows a block diagram of the data comparator 300 according to the preferred embodiment of the present invention. Each correlator 400 performs a 32-bit hamming distance comparison between input data and a reference data and outputs a 5-bit correlation value. The 5-bit correlation value is input to a 5-bit threshold unit 430 if the data comparator 300 is configured internally as four 32-bit correlators. There are four 5-bit threshold units 430, one for each 32-bit correlator 400. The 5-bit correlation value is passed to a 6-bit summation unit 420 if the data comparator 300 is configured internally as two 64-bit correlators. There are two 6-bit summation units 620, each one for two 32-bit correlators.

Specifically, correlator 400-0 and correlator 400-1 output their respective 5-bit correlation values to summation unit 420-1. Correlator 400-2 and correlator 400-3 output their respective 5-bit correlation values to summation unit 420-2. Each 6-bit summation unit 420-1 and 420-2 outputs a 6-bit summation output to a 6-bit threshold unit 440-0 and 440-1, respectively. In addition, each 6-bit summation unit outputs its 6-bit value to a 7-bit summation unit 460 for use when the data comparator 300 is configured internally as one 128-bit correlator. The 7-bit summation unit passes its 7-bit summation output to a 7-bit threshold unit 450. Thus, it becomes apparent that one extra bit is required for a 64-bit comparator or two extra bits are required for a 128-bit comparator.

Figure 7A:
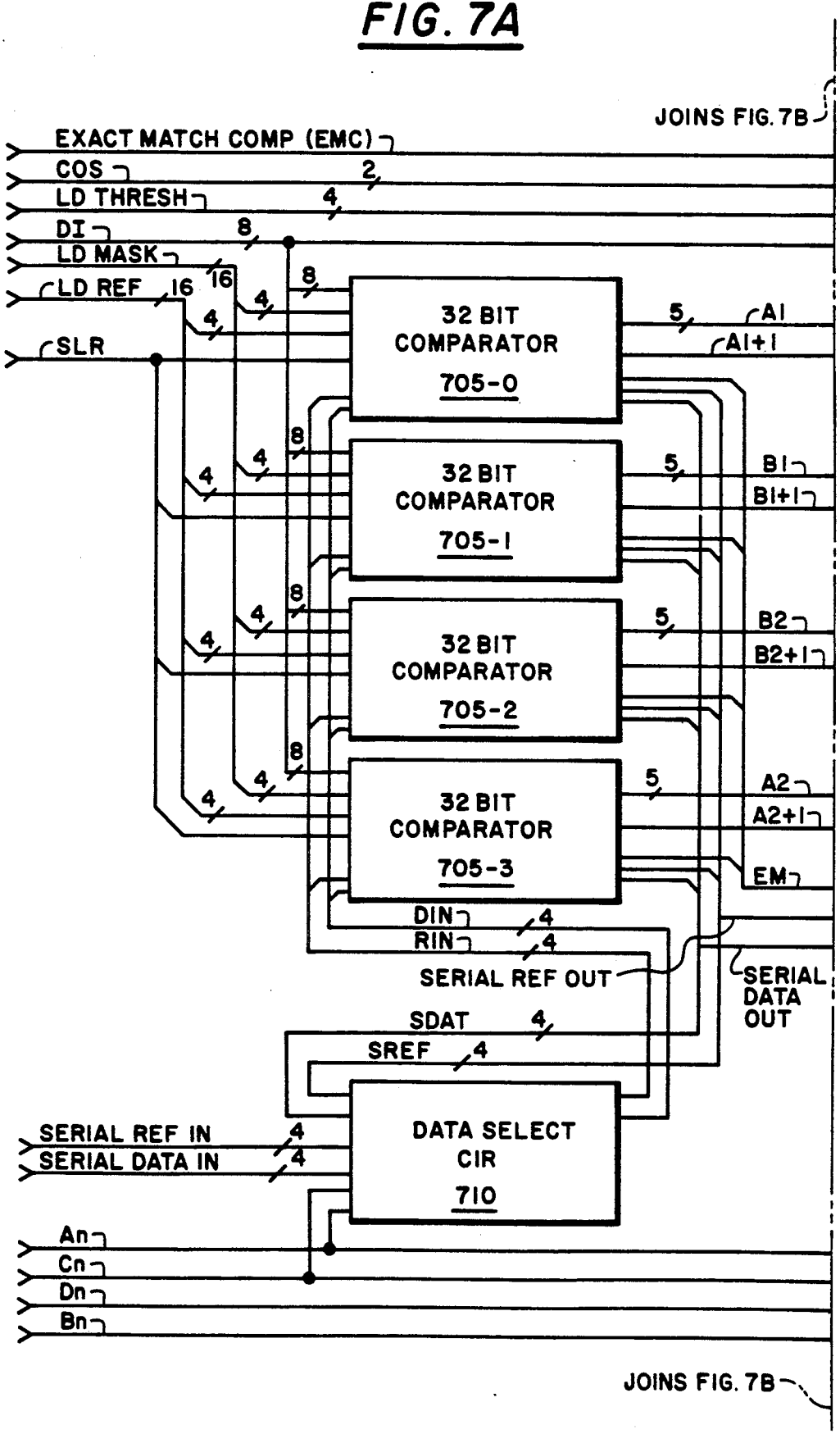
FIGS. 7A and 7B show an exemplary circuit diagram of the data comparator of FIG. 3.
Figure 7B:
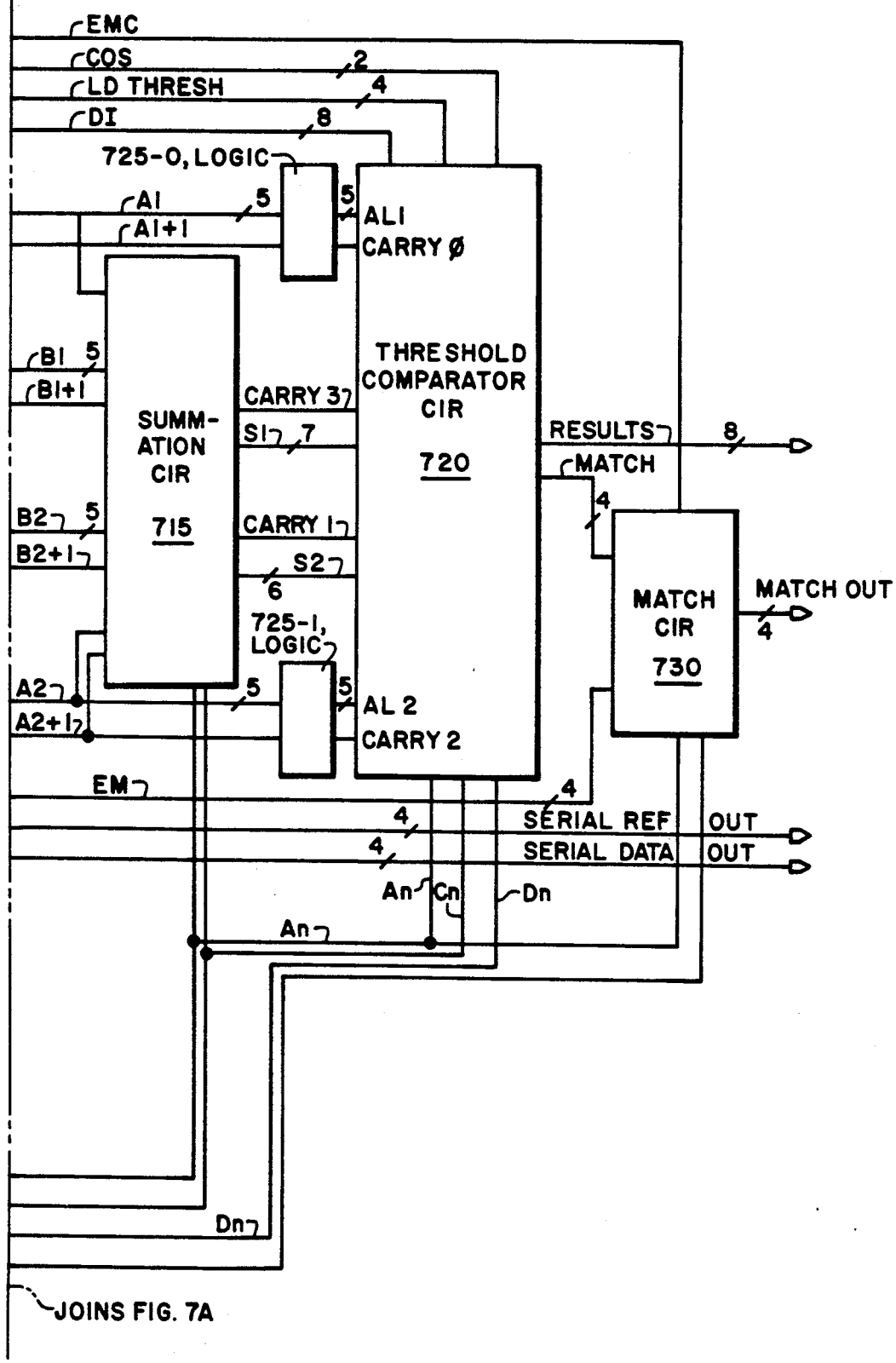

FIGS. 7A and 7B show an exemplary circuit diagram of the data comparator 300 shown in FIGS. 3 and 6. FIG. 7A is a first half of the data comparator 300 circuit diagram and FIG. 7B is a second half of the data comparator circuit diagram, so that the two figures should be considered together. As shown in FIG. 7A, four 32-bit comparators 705 are each coupled to the DI bus and the serial load register control signal SLR. In addition, each 32-bit comparator 705 receives four bits of the 16-bit LD MASK and LD REF signals, respectively, such that comparator 705-0 receives bits 0-3, comparator 705-1 receives bits 4-7, comparator 705-3 receives bits 8-11 and comparator 705-2 receives bits 12-15.

The data correlator 300 also includes a data select circuit 710 which receives simultaneous four bit input serial data streams (SERIAL DATA IN) and the simultaneous four bit input serial reference data streams (SERIAL REF IN). The data select unit 710 outputs the SERIAL DATA IN on the 4-bit DIN signal path and the SERIAL REF IN on the 4-bit RIN signal path to the 32-bit comparators 705 in response to the mode signals An and Cn. The comparators 705-0, 705-1, 705-3 and 705-2 receive bits 0, 1, 2 and 3 of the DIN and RIN signal paths, respectively. In addition, the comparators 705-0, 705-1, 705-3 and 705-2 output bits 0, 1, 2 and 3 of a SDAT and SREF signal path to the data select circuit 710, respectively. The comparators 705 and the data select circuit 710 are synchronized by a clock signal (not shown) in order to latch the serial data. Specifically, each comparator latches the leading bit on the DIN signal line and shifts the data currently-stored data (for example, the previously-latched data) in response to the clock signal (not shown). Thereafter, each comparator performs a 32-bit hamming distance correlation.

Thus, each of the comparators 705 operate in a pipelined mode, so that the latching shifting and correlating is performed within each clock cycle.

The data select circuit 710 serially outputs to each of the 32-bit comparators the appropriate serial data in accordance with the configuration mode of the data correlator 300. For example, if the four 32-bit correlator mode is chosen (An=0, Cn=1), one bit stream of the input serial reference data (SERIAL REF IN) and one bit stream of the input serial data (SERIAL DATA IN) are transmitted to each of the 32-bit comparator units 705. Thus, four 32-bit correlations are performed in parallel. However, when the two 64-bit comparator mode is selected (An=1, Cn=1), the data select circuit 710 directs one of two input serial data streams along signal path DIN to the 32-bit compare unit 705-0 and 705-2; the 32-bit comparators 705-0 and 705-2 serially shift the input serial data stream and output the serial data stream on signal paths SDAT(0) and SDAT(3) until 64 bits have been input to the comparators 705-0 and 705-2. The data select unit 710 sequentially receives the first 32 bits of the two data streams from the signal path SDAT and passes them in sequential lock step fashion (e.g., serial shift and latch) to the next 32-bit comparators 705-1 and 705-3, respectively, to effectively create a 64-bit comparator. Thus, the 32-bit compare unit 705-0 passes the first 32-bits to 32-bit compare unit 705-1, so that the 32-bit comparator 705-0 stores the upper half of a 64-bit word and the 32-bit comparator 705-1 stores the lower half of the 64-bit word. Similarly, the comparator 705-2 passes the first thirty-two bits of the 64-bit word through the data select unit 710 to the 32-bit comparator 705-3.

Similarly, in order to effectively create a 128-bit comparator, the data select circuit 710 sequentially routes only one of the input serial data streams (e.g., bit 0 of SERIAL DATA IN) through all four 32-bit comparators 705-0, 705-1, 705-2 and 705-3 in lock step fashion to obtain the 128 bits of comparison. Thus, the first serial bit for the 128-bit data stream will follow the signal path: SERIAL DATA IN(0), DIN(0), SDAT(0), DIN(1), SDAT(1), DIN(3), SDAT(3), DIN(2). Thus, the first serial bit for the 128-bit data stream will ultimately be stored in the 32-bit comparator 705-3, while the 128-th serial bit will be stored in the 32-bit comparator 705-0.

The input serial reference data (SERIAL REF IN) signals are handled in the same manner as the input serial data (SERIAL DATA IN) when a serially load reference data signal (SLR) enables the 32-bit comparators 705. In other words, the comparators 705 latch the serial reference data in response to the serial load reference data signal SLR; otherwise, the reference data may be loaded in parallel from the DI bus, as explained below.

The 32-bit comparators 705 may be parallely loaded with reference data presented on the 8-bit data lines DI in response to the serial load reference control signal SLR. Each 32-bit comparator receives a 4-bit LD REF signal; each bit of the 4-bit LD REF signal corresponds to an 8-bit-wide data slice within the 32-bit comparator. In other words, reference data is segmented into 8-bit contiguous slices (i.e. 0-7, 8-15, 16-23, 24-31); each of these slices latch the data on the 8-bit DI bus in response to the corresponding bit of the 4-bit LD REF signal. As a result, all thirty-two bits of reference data for each 32-bit comparator 705 can be loaded using the 8-bit DI data bus in accordance with the corresponding bit of the LD REF control signal. Once the reference data is loaded, it may be serially shifted if the serially load reference control signal (SLR) is inverted.

The mask data is loaded in parallel fashion only. The 8-bit parallel data input line DI loads the 32-bit comparator 705 in 8-bit slices in response to the corresponding LD MASK bit in the same manner as described above for the parallel loading of the reference data. A 4-bit mask load control signal LD MASK is input to each 32-bit comparator 705 as shown in FIG. 7, i.e. the lowest four bits LD MASK(0–3) are input to 32-bit comparator 705-0, bits LD MASK(4–7) are input to 32-bit comparator 705-1, bits LD MASK(8–11) are input to the 32-bit comparator 705-3, and bits LD MASK(-12–15) are input to the 32-bit comparator 705-2.

The reference data input to the 32-bit comparator 705 (either by serially loading RIN or parallely loading DI) is stored in a reference data register within the 32-bit comparator 705. Each 32-bit comparator 705 also includes a data register for storing input serial data, and a mask data register for storing input mask data.

The correlation process within each of the 32-bit comparators 705 will now be described. The stored input data is bitwise exclusively nor'd (e.g., XOR function has an inverted output) with the stored reference data and bitwise AND'd with the stored mask data producing a hamming correlation between the stored data and the stored reference data. An exact match signal EM is output high from the comparator 705 when an exact match is found (e.g., the hamming distance equals zero) between the stored input data and the stored reference data. The number of bit matches in the hamming correlation are summed and output from each 32-bit comparator 705-0, 705-1, 705-2, 705-3 on 5-bit signal lines A1, B1, A2 and B2 respectively. It will be apparent that the 5-bit signal represents up to 32 possible outcomes in the comparison (i.e., there could be 32 matches in a 32-bit comparison). The 32-bit comparators 705-0, 705-1, 705-2 and 705-3 each output an expansion bit signal A1+1, B1+1, A2+1 and B2+1 respectively, which represent a carry in bit for subsequent summations if the 64-bit or 128-bit comparator configuration is selected.

Each 32-bit comparator 705 outputs serial reference data SREF and serial data SDAT, which is output to the data select circuit 710 and external circuitry (not shown).

The comparison results of the 32-bit comparators 705 and the corresponding expansion bit signals (carry-in bits) are input to a summation circuit 715. The summation circuit 715 collects the 32-bit comparison results and selectively integrates the results into two 64-bit correlation results or one 128-bit correlation result in response to the internal configuration mode control signals An and Cn. Specifically, if the data comparator 300 is operating in the four 32-bit correlator mode, the summation circuit 715 passes the results of the 32-bit comparators 705 (A1, B1, B1+1, A2, A2+1, B2 and B2+1) to a threshold compare circuit 720. If the data comparator 300 is operating in the two 64-bit correlator mode, the summation circuit 715 functions in a manner similar to the summation circuit 420 shown in FIG. 6; the summation circuit 715 adds the results A1 and B1 of the 32-bit comparators 705-0 and 705-1 (and carry signal B1+1), and also adds the results A2 and B2 of the comparators 705-2 and 705-3 (and carry signal B2+1) and outputs the two 64-bit correlation results as 6-bit values on the S1 and S2 signal lines. If the data comparator 300 is operating in the 128-bit correlator mode, the summation circuit 715 functions in a manner similar to the summation circuit 460 shown in FIG. 6; the summation circuit 715 adds the 64-bit results calculated above and includes the carry signal A2+1, and outputs the 128-bit correlation results as a 7-bit value on the S1 signal line.

Figure 8:
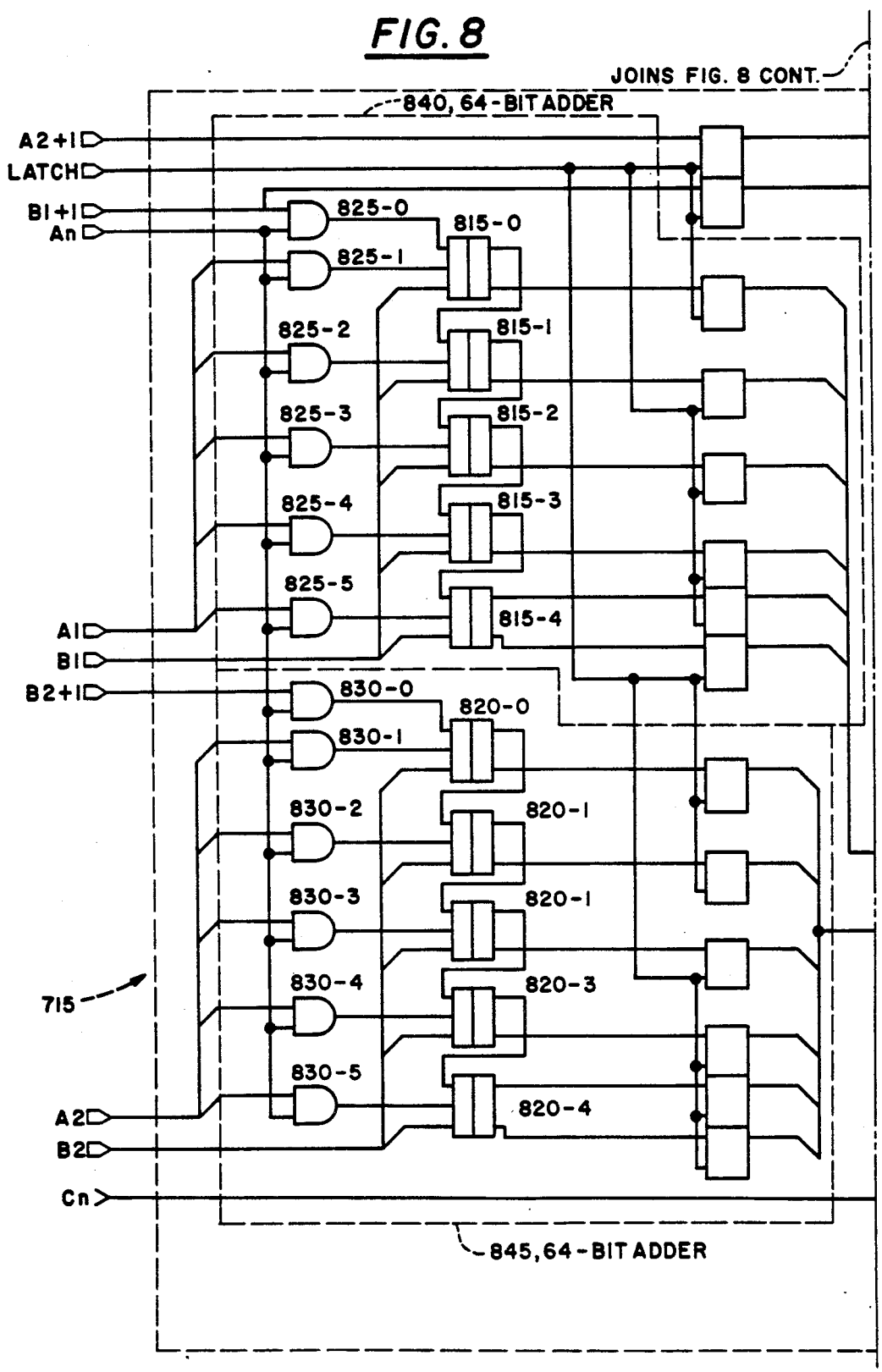
FIG. 8 shows an exemplary circuit of the sum unit of FIG. 7B.
Figure 8:
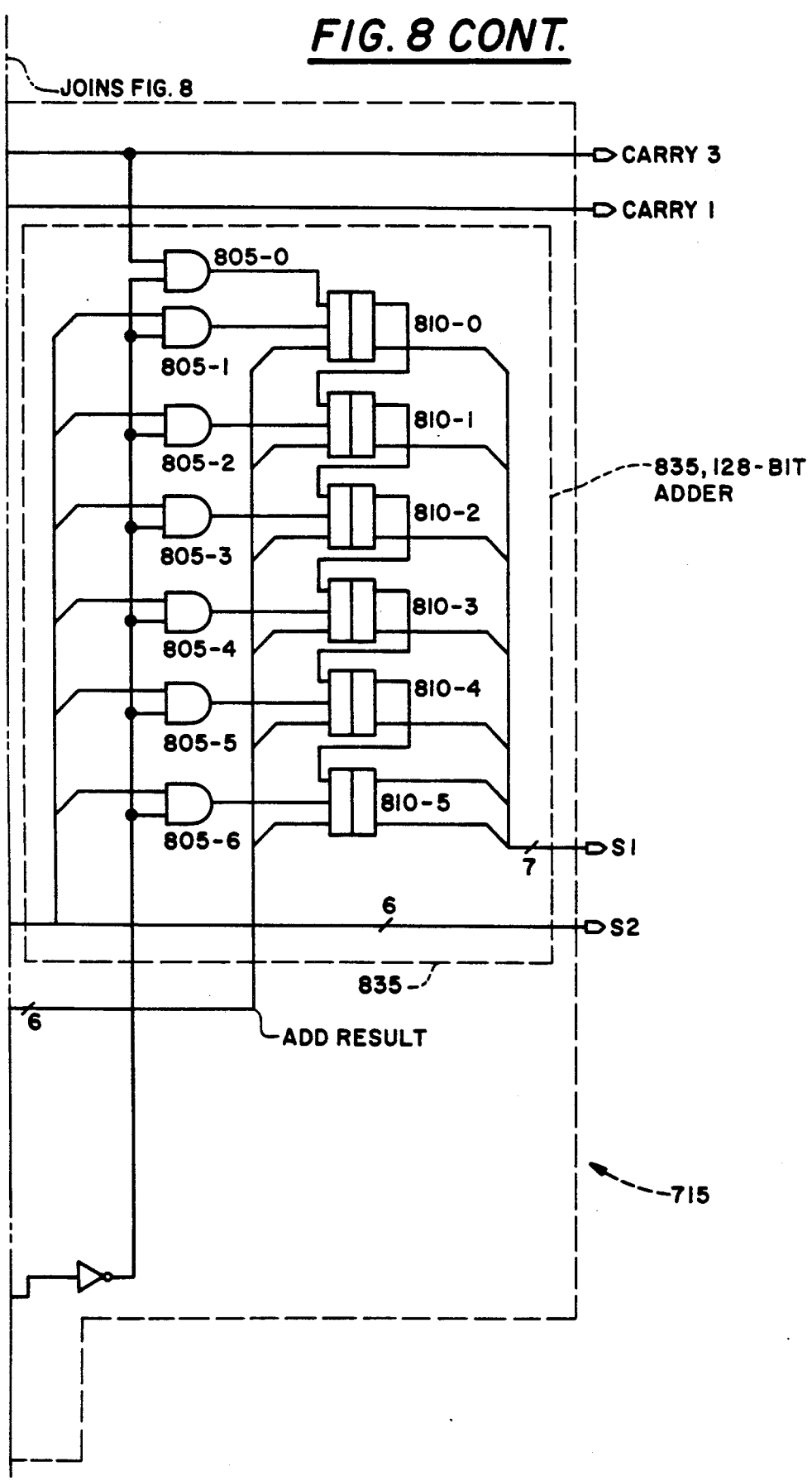

Therefore, carry in bits B1+1, A2+1 and B2+1 from 32-bit comparator 705-1, 705-2, and 705-3 are all used by summation circuit 715 to compensate for the different modes of operation (to be described in more detail in reference to FIG. 8).

The results of summation circuit 715 (S1 and S2) are output to the threshold compare circuit 720 through a logic circuit 725 to make corrections due to the mode of operation. Specifically logic circuit 725-0 allows the results of 32-bit comparator 705-0 (A1 and A1+1) to pass through to threshold compare circuit 720 through signal lines ALI and CARRY0 respectively when the 32-bit data correlation mode is chosen. The logic circuit 725-1 works in the same manner as logic circuit 725-0 except it works in conjunction with 32-bit comparator 705-2, so that input signals A2 and A2+1 are passed through to the threshold compare circuit 720 through signal lines AL2 and CARRY2, respectively. Although not shown, the logic circuits 725 are arranged to inhibit propagation of data to the threshold compare circuit 720 when any mode other than the 32-bit data correlation mode is selected.

The threshold compare circuit 720 is loaded with threshold data (e.g., the predetermined value for a threshold test) through the 8-bit parallel data input bus DI. The threshold data from the 8-bit parallel data input bus DI is latched in a threshold register within threshold compare circuit 720 in response to the 4-bit LD THRESH signal. Bit DI(0) is the least significant bit from the data bus DI and bits DI(4), DI(5) and DI(6) are the most significant bits for the 32-bit, 64-bit and 128-bit modes, respectively. TABLE 4 shows the magnitude of the bits written to the threshold register within threshold compare circuit 720.

TABLE 4

| Threshold Register (S1 − 0 = 11): | | | | | | | |
|---|---|---|---|---|---|---|---|
| D7 | D6 | D5 | D4 | D3 | D2 | D1 | D0 |
| | | | MSB | | | | LSB |
| | | MSB | | | | | LSB |
| | MSB | | | | | | LSB |
| BIT4 | BIT5 | BIT6 | MSB | BIT3 | BIT2 | BIT1 | LSB |

The parallel data DI is latched in by the 4-bit threshold load control signal LD THRESH. Each bit of the LD THRESH signal controls one of the four threshold registers, so that each of the four threshold registers may store a separate threshold value when the data correlator is operated in the 4×32-bit mode. Similarly, only two threshold registers are needed when the data correlator is operated in the 2×64-bit mode. The internal configuration mode control signals An, Cn and Dn are input to threshold compare circuit 720 to determine the size of comparison to be performed and whether to operate in the CS1212 compatible mode.

The correlation result from the correlators, e.g., the number of bits of the input data which are different from the reference data, are output on an 8-bit RESULT signal line from the threshold compare circuit 720. If the data correlator is operated in the 4×32-bit mode or the 2×64 bit mode, the correlation results are sequentially read out in response to the 2-bit comparison out select COS signal line. The threshold compare circuit 720 also outputs the results of a threshold comparison operation on signal path MATCH, indicating whether the sum of correlated bits in agreement are less than or equal to the threshold data value. Four parallel bit lines MATCH(0) to MATCH(3) are output from the threshold compare circuit 720 when the 32-bit correlation mode is selected. The threshold compare circuit 720 outputs two parallel data lines MATCH(0) and MATCH(1) when the 64-bit data correlation mode is selected. One data line MATCH(0) is output by threshold compare circuit 720 when the 128-bit data correlation mode is selected.

The exact match comparison control signal (EXACT MATCH COMP/EMC) enables a match circuit 730 to determine if an exact match has been made between the reference data and the input data. The match circuit 730 either combines the exact match signals (EM) from 32-bit comparator 705 or else passes the results of the exact match signal (EM) of the 32-bit comparator 705 directly through to four parallel lines MATCH OUT, depending on which mode of operation has been selected. Internal configuration mode control signals An and Bn are used to determine which mode of operation has been selected by match circuit 730. The match circuit 730 outputs the results of an exact match comparison onto four parallel data bit streams MATCH OUT(0) to MATCH OUT(3) if the 32 bit comparator mode has been selected. Two parallel data bit lines MATCH OUT(0) and MATCH OUT(1) are output by the match circuit 730 when the 64-bit data comparator mode is selected. The match circuit 730 outputs one data bit line MATCH OUT(0) when the 128-bit data correlator mode is selected.

The match circuit 730 will output the final results of a threshold comparison from the threshold comparator circuit 720 when the exact match compare control signal (EMC) is inverted. Four parallel data lines MATCH OUT(0) to MATCH OUT(3) are used when the 32-bit data correlator mode is selected. Two data lines MATCH OUT(0) and MATCH OUT(1) are used when the 64-bit correlation mode is selected, and one data line MATCH OUT(0) is used when the 128-bit data correlator mode is selected. Thus, the match circuit 730 can output either the results of an exact match comparison or the results of the threshold comparison in response to the EMC signal.

FIG. 8 shows an exemplary circuit diagram of summation circuit 715 shown in FIG. 7. As shown in FIG. 8, the summation circuit 715 includes a primary 64-bit adder 840, a secondary 64-bit adder 845, and a 128-bit adder 835. The primary and secondary adders 840 and 845 each add the 32-bit correlation results in order to obtain a 64-bit correlation result and the 128-bit adder 835 adds the results of the 64-bit adders 840 and 845 to obtain the 128-bit correlation result. The adders 840, 845 and 835 are enabled in response to the internal configuration mode of the data correlator. Specifically, 128-bit adder 835 and 64-bit adders 840 and 845 are enabled when the data correlator is in the 128-bit configuration. However, when the 64-bit configuration is set, the 128-bit adder is disabled via the configuration mode signal Cn so that the output signal ADD RESULT from the secondary 64-bit adder 845 is passed through the adder 835. Similarly, when the 64-bit adders 840 and 845 are disabled by the configuration signal An, the 32-bit correlation result signals B1 and B2 are passed through the respective adders so that signal B1 is passed to the lowest five bits of output signal S2 and signal B1 is passed to the lowest five bits of output signal S1. The operation of the summation circuit 715 will be described in more detail below.

The internal configuration mode signal An is logically AND'd with carry in signal B1+1 in AND gate 825-0. The result of AND 825-0 is a 1 when both B1+1 and An are both a logic 1. The result of AND 825-0 is fed to a carry in input of a full adder 815-0. The addition of this carry in bit allows the expansion of the effective correlator word length to 64-bits from two 32-bit comparators 705. The internal configuration signal An is AND'd in AND gates 825 with the results of 32-bit comparator 705-0 (A1) to allow either the pass through of result signal of 32-bit comparator 705-1 or B1 on the addition of signals A1 and B1 in full adders 815. If An is logic level zero, the AND gate 825 will output zero to full adders 815. The addition of zero to result of 32-bit comparator 205-1 on signal B1 passes the result B1 directly through full adders 815, effectively creating a pass through of signal B1. Full adders 820 and AND gates 830 work in the same manner except result A2 is substituted for result A1, result signal B2 is substituted for result signal B1, and carry signal B2+1 is substituted for carry signal A2+1.

The operation of the 128-bit adder 835 is similar to the operation of the 64-bit adders 840 and 845. The carry in signal A2+1 is logically AND'd with internal configuration mode control signal Cn in AND gate 805-0 when carry in bit A2+1 from 32-bit comparator 705-2 is a logic level 1 and internal configuration mode control signal Cn is a logic 1 (128-bit correlation mode selected). The AND gate 805-0 sends the carry in bit A2+1 to a carry input of full adder 810-0 allowing for the increased magnitude required to sum 128 bits from the six-bit signals ADD RESULT and S2 from the adders 845 and 840, respectively. The addition result is output as a 7-bit value on the signal path S1, which represents the 7-bit correlation value for the 128-bit correlation.

Thus, the summation circuit 715 is capable of performing multiple addition processes in order to obtain the appropriate bit-length comparison result. Since the carry-in values are preserved for the 32-bit and 64-bit correlation values, the 128-bit result can be quickly determined by one extra addition process.

The present invention enables a user to select the word length of a hamming data correlator with ease and minimal addressing modifications. A user can configure the data correlator to perform in a 4×32-bit mode, a 2×64-bit mode or a 128-bit mode. The 32-bit data correlators receive data from a data select circuit which transmits serial data in accordance with the selected configuration of the data correlator. Data is efficiently transmitted on the CPU data bus, namely the CPU data bus shares correlation results from the data correlator with control instructions from the microprocessor. As a result, efficiency of data manipulation between the external microprocessor and the data correlator is improved.

Although the preferred embodiment uses 32-bit, 64-bit and 128-bit length correlators, it will be appreciated that any length correlator can be used, either by masking out a portion of the correlators, or by using a different base-length correlator other than 32 bits. Also, one skilled in the art will appreciate that a plurality of data correlators may be coupled to increase the capacity of bit-length or parallel correlations. Further, the preferred embodiment may be modified by having an internal memory, such as a RAM or mask ROM to store control data, reference data or mask data.

Also, the results of data correlation could be output to an internal memory for future comparisons. In other words, the reference value could be updated in accordance with the determined correlation result RESULT so that an adaptive correlation could be realized.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A selectable word-length data correlator for determining a correlation result between serial input data and a reference data, said data correlator comprising:
   a first correlator for determining a first correlation signal representing a first correlation between a first data stream of said serial input data and a first reference signal of said reference data, said first correlator determining said first correlation on the basis of a first bit-length;
   a second correlator for determining a second correlation signal representing a second correlation between a second data stream of said serial input data and a second reference signal of said reference data, said second correlator determining said second correlation on the basis of said first-bit-length; and
   means for selecting a bit length of said data correlator in response to an external configuration signal, said selecting means comprising:
   means for supplying said first and second data stream to said respective first and second correlators in response to said external configuration signal, said supplying means receiving said serial input data, and
   a summation circuit for determining and outputting said correlation result in response to said first and second correlation signals, said correlation result being determined in accordance with said selected bit length of said data correlator.

2. A data correlator as recited in claim 1, further comprising a CPU bus interface for enabling communication between said data correlator and a CPU bus, said CPU bus interface outputting said correlation result onto said CPU bus and receiving data from said CPU bus in response to an address signal.

3. A data correlator as recited in claim 2, further comprising:
   an internal data bus for enabling communication between said CPU interface, said first and second correlator and said selecting means; and
   a control circuit coupled to said internal data bus for sequentially addressing register locations within said first and second correlator and said selecting means to load data from said internal data bus, said control circuit sequentially addressing said register locations in response to an external address.

4. A data correlator as recited in claim 1, wherein:
   said selecting means selects said first or a second bit length as said bit length,
   said supplying means simultaneously supplying said first and second correlators with said first and second data streams when said first bit length is selected, said first and second correlators thereby simultaneously determining said first and second correlation, respectively;
   said supplying means supplying said second correlator with said second data stream as a shifted data stream from said first correlator when said second bit length is selected, said first and second data stream being a series of said serial input data.

5. A data correlator as recited in claim 4, wherein said second bit length is a multiple of said first bit length.

6. A data correlator as recited in claim 1, further comprising:
   a third correlator for determining a third correlation signal representing a third correlation between a third data stream of said serial input data and a third reference signal of said reference data, said third correlator determining said third correlation on the basis of said first bit-length;
   a fourth correlator for determining a fourth correlation signal representing a fourth correlation between a fourth data stream of said serial input data and a fourth reference signal of said reference data, said fourth correlator determining said fourth correlation on the basis of said first bit-length;
   wherein said supplying means supplies said third and fourth data stream to said respective third and fourth correlators in response to said external configuration signal;
   wherein said summation circuit outputs said correlation result in response to said first, second third and fourth correlation signals.

7. A data correlator as recited in claim 6, wherein said selecting means selects said first bit length, a second bit length or a third bit length as said bit length, said second bit length being a multiple of said first bit length and said third bit length being a multiple of said second bit length.

8. A data correlator as recited in claim 7, wherein said first bit length is 32 bits, said second bit length is 64 bits and said third bit length is 128 bits.

9. A data correlator as recited in claim 7, wherein said summation circuit comprises:
   a first adder for determining a first correlation result at said second bit length in response to said first and second correlation signals;
   a second adder for determining a second correlation result at said second bit length in response to said third and fourth correlation signals; and
   a third adder for determining a correlation result at said third bit length in response to said first and second correlation result at said second bit length.

10. A data correlator as recited in claim 1, wherein said correlation result is a hamming distance correlation.

* * * * *